US010430971B2

(12) United States Patent
Ueno et al.

(10) Patent No.: US 10,430,971 B2
(45) Date of Patent: Oct. 1, 2019

(54) PARALLAX CALCULATING APPARATUS

(71) Applicants: TOYOTA JIDOSHA KABUSHIKI KAISHA, Toyota-shi, Aichi-ken (JP); TOKYO INSTITUTE OF TECHNOLOGY, Tokyo-to (JP)

(72) Inventors: Junya Ueno, Susono (JP); Keiji Saneyoshi, Tokyo-to (JP); Hiroaki Iwata, Atsugi (JP)

(73) Assignees: TOYOTA JIDOSHA KABUSHIKI KAISHA, Toyota-shi, Aichi-ken (JP); TOKYO INSTITUTE OF TECHNOLOGY, Tokyo (JP)

( * ) Notice: Subject to any disclaimer, the term of this patent is extended or adjusted under 35 U.S.C. 154(b) by 40 days.

(21) Appl. No.: 15/895,181

(22) Filed: Feb. 13, 2018

(65) Prior Publication Data
US 2018/0232908 A1  Aug. 16, 2018

(30) Foreign Application Priority Data

Feb. 15, 2017  (JP) .................................. 2017-026154

(51) Int. Cl.
*G06K 9/00*  (2006.01)
*G06T 7/80*  (2017.01)
(Continued)

(52) U.S. Cl.
CPC ................ *G06T 7/80* (2017.01); *G06T 7/593* (2017.01); *G06T 7/97* (2017.01); *H04N 13/207* (2018.05);
(Continued)

(58) Field of Classification Search
None
See application file for complete search history.

(56) References Cited

U.S. PATENT DOCUMENTS

| 2013/0258100 A1* | 10/2013 | Asatani ................... G01C 3/08 |
| | | 348/140 |
| 2016/0146602 A1* | 5/2016 | Ishimaru ................. G06T 7/593 |
| | | 348/47 |
| 2017/0163960 A1 | 6/2017 | Nagata et al. |

FOREIGN PATENT DOCUMENTS

| JP | 2016-001841 A | 1/2016 |
| JP | 2016-062356 A | 4/2016 |
| JP | 2016-099318 A | 5/2016 |

OTHER PUBLICATIONS

Heiko Hirschmuller; "Accurate and Efficient Stereo Processing by Semi-Global Matching and Mutual Information"; Proceedings of the IEEE Conference on Computer Vision and Pattern Recognition (CVPR), Jun. 20-26; 2005; pp. 1-8; San Diego, CA.

* cited by examiner

*Primary Examiner* — Stephen P Coleman
(74) *Attorney, Agent, or Firm* — Sughrue Mion, PLLC

(57) ABSTRACT

A parallax calculating apparatus is provided with: a processor configured to perform, on each of a plurality of types of block shapes that are different from each other, (i) a parallax calculation process, (ii) a block group setting process, and (iii) a cost calculation process, by using a pair of images photographed by a stereo camera; and a selector configured to perform, on each of a plurality of pixels that constitute the image, a parallax selection process of setting a parallax value of a block in which a cost associated by the cost calculation process is minimum, as a parallax of a target pixel in which the parallax is to be obtained, from among a plurality of blocks, each of which includes the target pixel and which respectively correspond to the plurality of types of block shapes.

4 Claims, 3 Drawing Sheets

(51) Int. Cl.
*G06T 7/00* (2017.01)
*H04N 13/207* (2018.01)
*G06T 7/593* (2017.01)
*H04N 13/00* (2018.01)

(52) U.S. Cl.
CPC .............. *G06T 2207/10012* (2013.01); *G06T 2207/20012* (2013.01); *G06T 2207/20021* (2013.01); *G06T 2207/30252* (2013.01); *H04N 2013/0081* (2013.01)

PARALLAX CALCULATING APPARATUS

CROSS-REFERENCE TO RELATED APPLICATIONS

This application is based upon and claims the benefit of priority of the prior Japanese Patent Application No. 2017-026154, filed on Feb. 15, 2017, the entire contents of which are incorporated herein by reference.

BACKGROUND OF THE INVENTION

1. Field of the Invention

Embodiments of the present invention relate to a parallax calculating apparatus.

2. Description of the Related Art

For a parallax calculation method used in this type of apparatus, for example, there has been proposed semi global matching (SGM) that performs pixelwise matching between left and right images, which are photographed by a stereo camera, by adding, to a cost function, smoothness to surroundings of a pixel of interest (refer to Heiko Hirschmuller, "Accurate and Efficient Stereo Processing by Semi-Global Matching and Mutual Information", Proceedings of the IEEE Conference on Computer Vision and Pattern Recognition (CVPR), San Diego, Calif., USA, Jun. 20-26 2005 (Non-patent Literature 1)). There have been proposed an apparatus configured to detect a three-dimensional object by using the SGM (refer to Japanese Patent Application Laid Open No. 2016-062356 (Patent Literature 1) and a method of suppressing a processing cost in optimizing a parallax value in the SGM (refer to Japanese Patent Application Laid Open No. 2016-001841 (Patent Literature 2)).

For a parallax calculation method that is different from the SGM, there has been proposed a method of calculating a wind cost for a stereo image, which includes a standard image and a reference image, of calculating an evaluation value for each of all the pixels included in the standard image by using the wind cost, and of adopting a parallax that minimizes the evaluation value in a parallax search range as an optimum parallax of a pixel of interest (refer to Japanese Patent Application Laid Open No. 2016-099318 (Patent Literature 3)).

In the SGM described in the Non-patent Literature 1, an optimization calculation for an entire image is essential to solve the cost function, which relatively increases a calculation cost (i.e. a calculation amount). In addition, in order to obtain the parallax, it is necessary to store luminance information about the entire image in a memory, which relatively increases memory consumption. The techniques/technologies described in the Patent Literatures 1 to 3 cannot solve those problems.

SUMMARY

In view of the aforementioned problems, it is therefore an object of embodiments of the present invention to provide a parallax calculating apparatus that can suppress the calculation cost and the memory consumption.

The above object of embodiments of the present invention can be achieved by a parallax calculating apparatus is provided with: an acquirer configured to obtain a pair of images photographed by a stereo camera; a processor configured to perform, on each of a plurality of types of block shapes that are different from each other, (i) a parallax calculation process of dividing a standard image, which is one of the pair of images, into a plurality of blocks and of searching for a corresponding point included in a reference image, which is the other image of the pair of images, for each of the plurality of blocks, thereby calculating a parallax, (ii) a block group setting process of setting a block group, which includes a target block out of the plurality of blocks and a plurality of surrounding blocks surrounding the target block out of the plurality of blocks, and (iii) a cost calculation process of calculating an index indicating uniformity of the parallax associated with the set block group on the basis of a result of the parallax calculation process and of associating the calculated index with the target block as a cost indicating an evaluation associated with the target block; and a selector configured to perform, on each of a plurality of pixels that constitute the standard image, a parallax selection process of setting a parallax, which is calculated by the parallax calculation process, of a block in which the cost associated by the cost calculation process is minimum, as a parallax of a target pixel, from among a plurality of blocks, each of which includes the target pixel out of the plurality of pixels and which respectively correspond to the plurality of types of block shapes. Here, the "block" means a set of pixels that constitute an image. In other words, one block includes a plurality of pixels.

The parallax calculation process provides the calculation of the parallax for each block (i.e. "blockwise" calculation). The block group setting process provides the setting of the block group, which includes the target block and the plurality of surrounding blocks surrounding the target block. The cost calculation process provides the calculation of the index indicating the uniformity of the parallax associated with the set block group on the basis of the result of the parallax calculation process. The calculated index is associated with the target block, as the cost indicating the evaluation associated with the target block. In the parallax calculating apparatus, a series of processes, which are the parallax calculation process, the block group setting process, and the cost calculation process, is performed for each of the plurality of types of block shapes.

The parallax of each pixel is obtained as follows. Firstly, a cost associated with a block including a target pixel in which the parallax is to be obtained out of blocks in a first block shape (e.g. square), a cost associated with a block including the target pixel in which the parallax is to be obtained out of blocks in a second block shape (e.g. horizontally long rectangular), ..., and a cost associated with a block including the target pixel in which the parallax is to be obtained (i.e. a cost associated with a block including the target pixel, in each of the plurality of types of block shapes) out of blocks in a N-th block shape (wherein N is a natural number of 2 or more) are obtained, and a block associated with the minimum cost is selected. Then, the parallax that is the result of the parallax calculation process performed on the selected block is set as the parallax of the target pixel.

By the way, an optimum block shape varies depending on a target for which the parallax is to be obtained, the details of which will be explained in DETAILED DESCRIPTION OF THE PREFERRED EMBODIMENTS later. In a two-dimensional image, in an area corresponding to the ground (e.g. a road surface), pixels adjacent to each other in a horizontal direction of the image correspond to points that are substantially equidistant from an imaging point. Alternatively, in the two-dimensional image, in an area corresponding to a wall of a building, pixels adjacent to each other in a vertical direction of the image correspond to point that are substantially equidistant from the imaging point.

Thus, for example, if a vertically long rectangular block is used in obtaining the parallax of the area corresponding to the ground, the parallax will be the same for all the pixels included in the block, because the parallax is calculated for each block, even though the parallax is actually different between a point corresponding to a pixel on a lower side of the block and a point corresponding to a pixel on an upper side of the block. In other words, if the block shape is fixed, accuracy of the parallax calculated possibly decreases. On the other hand, it is hardly possible to specify in advance what appears in which area of the image and to set in advance an optimum block shape for each area.

In the parallax calculating apparatus, as described above, the series of processes is performed for each of the plurality of types of block shapes. At this time, for example, in the area corresponding to the ground, it is expected to have the minimum cost when the series of processes is performed by using an optimum block shape for the area. Moreover, in the parallax calculating apparatus, out of the plurality of blocks, each of which includes the target pixel and which respectively correspond to the plurality of types of block shapes, the parallax of the block with the minimum cost is set as the parallax of the target pixel. Thus, it is expected that the parallax of each pixel is automatically a parallax calculated by using the block in the block shape that is optimal for each pixel.

According to the parallax calculating apparatus, the parallax is calculated for each block. It is thus possible to suppress the calculation cost and the memory consumption in comparison with calculation of the pixel for each pixel (i.e. "pixelwise" calculation). Moreover, the series of processes including the parallax calculation process is performed for each of the plurality of types of block shapes, and the parallax is obtained for each pixel. It is thus possible to improve the parallax accuracy and to obtain a relatively high density parallax image.

In one aspect of the parallax calculating apparatus according to embodiments of the present invention, the cost calculation process includes (i) calculating a parallax difference between adjacent block in the set block group on the basis of the result of the parallax calculation process, and (ii) calculating the index on the basis of the calculated parallax difference. According to this aspect, the index indicating the uniformity of the parallax associated with the block group can be calculated, relatively easily.

In another aspect of the parallax calculating apparatus according to embodiments of the present invention, the processor is configured to perform, in parallel, the parallax calculation process, the block group setting process, and the cost calculation process for each of the plurality of types of block shapes. According to this aspect, it is possible to reduce a processing time, which is extremely advantageous in practice.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

A parallax calculating apparatus according to an embodiment of the present invention will be explained with reference to FIG. 1 to FIG. 4.

Figure 1:
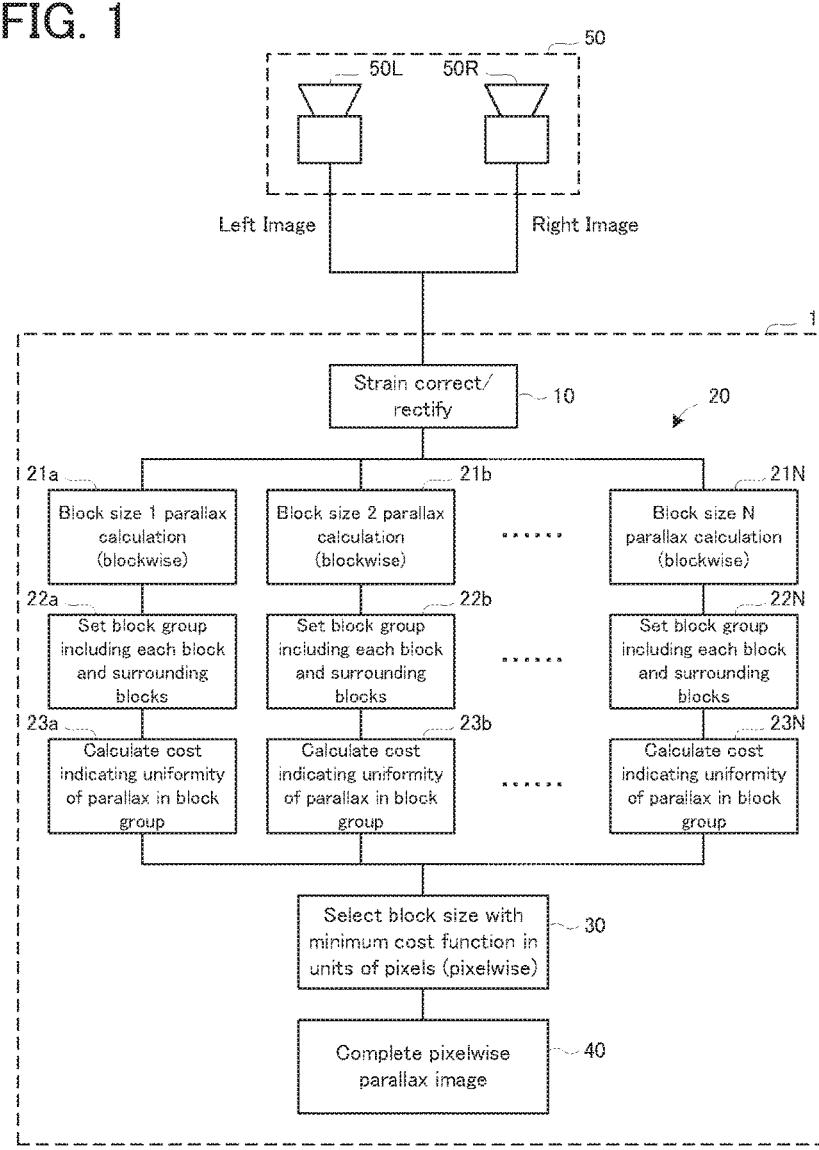
FIG. 1 is a block diagram illustrating a configuration of a parallax calculating apparatus according to an embodiment.

A configuration of the parallax calculating apparatus according to the embodiment will be explained with reference to FIG. 1. FIG. 1 is a block diagram illustrating the configuration of the parallax calculating apparatus according to the embodiment.

In FIG. 1, a parallax calculating apparatus 1 is provided with a distortion corrector/rectifier 10, a processor 20, a block size selector 30, and a parallax image generator 40, as processing blocks logically realized or as processing circuits physically realized in the parallax calculating apparatus 1. The processor 20 includes a plurality of parallax calculators 21a, 21b, . . . , and 21N, a plurality of block group setting units 22a, 22b, . . . , and 22N, and a plurality of cost calculators 23a, 23b, . . . , and 23N.

Next, each component of the parallax calculating apparatus 1 will be explained while mentioning a parallax calculation method in the parallax calculating apparatus 1.

The distortion corrector/rectifier 10 is configured to perform a distortion correction process and a rectification process, on each of a left image (i.e. an image photographed by a camera 50L) and a right image (i.e. an image photographed by a camera 50R), which are photographed by a stereo camera 50 including the cameras 50L and 50R. A detailed explanation of the distortion correction process and the rectification process will be omitted because various existing methods can be applied to the processes.

The processor 20 is configured to perform a parallax calculation process, a parallax difference calculation process, and a cost calculation process, by using the left image and the right image on which the distortion correction process and the rectification process are performed. It goes without saying that the left image and the right image used for the three processes are both photographed at the same time.

Each of the parallax calculators 21a, 21b, . . . , and 21N is configured to divide a standard image, which is one of the left image and the right image, into a plurality of blocks (i.e. a set of pixels), and to search for a corresponding point included in a reference image, which is the other image of the left image and the right image, for each of the plurality of blocks, thereby calculating the parallax. In other words, each of the parallax calculators 21a, 21b, . . . , and 21N is configured to calculate the parallax for each block.

Particularly in the embodiment, each of the parallax calculators 21a, 21b, . . . , and 21N is configured to divide the standard image in a respective one of different block shapes. Now, the block shape will be explained with reference to FIG. 2A to FIG. 2D, and FIG. 3.

As illustrated in FIG. 2A to FIG. 2D, if the block shape is quadrangular, each of the parallax calculators 21a, 21b, . . . , and 21N is configured to divide a standard image 100 in a respective one of quadrangles with different aspect ratios.

Even if the block shape is different, the area of one block (i.e. the number of pixels that constitute one block) is typically the same. Specifically, for example, if the area of one block is "32", the block shape includes "1 long by 32 wide", "2 long by 16 wide", "4 long by 8 wide", "8 long by 4 wide", "16 long by 2 wide", and "32 long by 1 wide".

Figure 3:
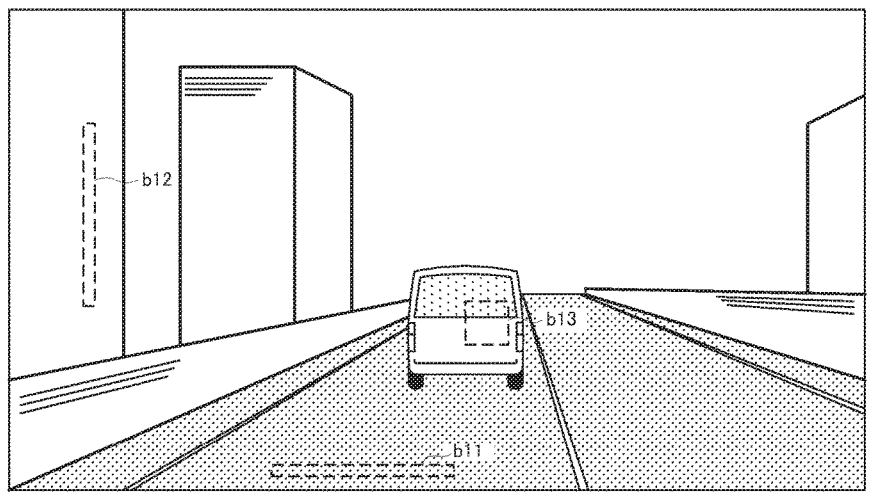
FIG. 3 is a diagram illustrating one example of an image used for the parallax calculation.

For example, it is assumed that an image illustrated in FIG. 3 is a target image in parallax calculation. For example, in an area corresponding to a road surface, the parallax is (substantially) the same among pixels arranged in a horizontal direction of the image, while the parallax is different among pixels arranged in a vertical direction of the image corresponding to a depth direction. Thus, when calculating the parallax in the area corresponding to the road surface, it is desirable to use a horizontally long quadrangular block, such as, for example, a block b11.

For example, in an area corresponding to a side surface of a building, the parallax is (substantially) the same among pixels arranged in the vertical direction of the image, while the parallax is different among pixels arranged in the horizontal direction of the image corresponding to the depth direction. Thus, when calculating the parallax in the area corresponding to the side surface of the building, it is desirable to use a vertically long quadrangular block, such as, for example, a block b12.

For example, in an area corresponding to a rear part of a preceding vehicle, the parallax is (substantially) the same among pixels arranged in the vertical direction of the image and among pixels in the horizontal direction of the image. On the other hand, a range of this area on the image is relatively small, and thus, a block in the block shape such as, for example, the blocks b11 and b12 may include an object that is different from the rear part of the preceding vehicle. It is therefore desirable to use a quadrangular block close to a square, such as, for example, a block b13, when calculating the parallax in the area corresponding to the rear part of the preceding vehicle.

As described above, an optimum block shape varies depending on a target for which the parallax is to be obtained. It is, however, hardly possible to specify in advance what appears in which area of a target image. Thus, in the embodiment, the parallax is calculated for each block with respect to each of the plurality of types of block shapes, and the block shape is selected for each pixel, as described later, on the basis of a calculation result of the parallax.

Figure 4:
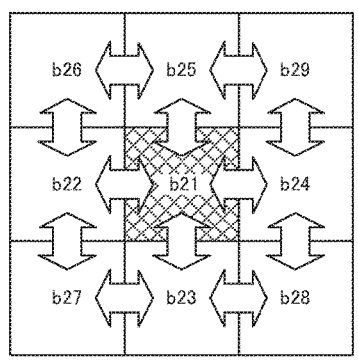
FIG. 4 is a diagram illustrating a calculation concept of a parallax difference in the parallax calculating apparatus according to the embodiment.

Back in FIG. 1 again, each of the block group setting units $22a$, $22b$, . . . , and $22N$ is configured to set a block group, which includes a target block and surrounding blocks thereof. Each of the cost calculators $23a$, $23b$, . . . , and $23N$ is configured to calculate an index indicating uniformity of the parallax associated with the block group set by a respective one of the block group setting units $22a$, $22b$, . . . , and $22N$, on the basis of a parallax calculation result of a respective one of the parallax calculators $21a$, $21b$, . . . , and $21N$. Each of the cost calculators $23a$, $23b$, . . . , and $23N$ is configured to associate the calculated index with the target block included in the block group targeted for the calculation of the index, as a cost indicating an evaluation associated with the target block. Specifically, for example, it is assumed that a square block b21 illustrated in FIG. 4 is the target block. In this case, one block group setting unit (i.e. one of the block group setting units $22a$, $22b$, . . . , and $22N$) may set one block group from the block b21 and blocks b22 to b29 surrounding the block b21. Here, it is assumed that the blocks b21, b22, b23, b24, b25, b26, b27, b28, and b29 respectively have parallax values of p1, p2, p3, p4, p5, p6, p7, p8, and p9.

One cost calculator (i.e. one of the cost calculators $23a$, $23b$, . . . , and $23N$) corresponding to the one block group setting unit may calculate a parallax difference between adjacent blocks in the block group (i.e. the blocks b21 to b29).

The parallax difference between the block b21 and the block b22 is (p1−p2). The parallax difference between the block b21 and the block b23 is (p1−p3). The parallax difference between the block b21 and the block b24 is (p1−p4). The parallax difference between the block b21 and the block b25 is (p1−p5). The parallax difference between the block b22 and the block b26 is (p2−p6). The parallax difference between the block b22 and the block b27 is (p2−p7). The parallax difference between the block b23 and the block b27 is (p3−p7). The parallax difference between the block b23 and the block b28 is (p3−p8). The parallax difference between the block b24 and the block b28 is (p4−p8). The parallax difference between the block b24 and the block b29 is (p4−p9). The parallax difference between the block b25 and the block b29 is (p5−p9). The parallax difference between the block b25 and the block b26 is (p5−p6).

The one cost calculator may then calculate the sum of squares of the parallax difference, as the index indicating the uniformity of the parallax associated with the block group, on the basis of the calculated parallax difference. The one cost calculator may associate the calculated sum of squares of the parallax difference with the block b21, as a cost indicating an evaluation associated with the block b21.

The cost regarding the block b21 may be expressed as $(p1-p2)^2+(p1-p3)^2+(p1-p4)^2+(p1-p5)^2+(p2-p6)^2+(p2-p7)^2+(p3-p7)^2+(p3-p8)^2+(p4-p8)^2+(p4-p9)^2+(p5-p9)^2+(p5-p6)^2$.

If the block shape is a shape suited for a target for which the parallax is to be calculated, the parallax difference between adjacent blocks is considered to be relatively small. In other words, the parallax is considered to change relatively smoothly between adjacent blocks. It is therefore possible to select the block shape suited for the target for which the parallax is to be calculated, by comparing calculations results of the cost calculators $23a$, $23b$, . . . , and $23N$.

Figure 2A:
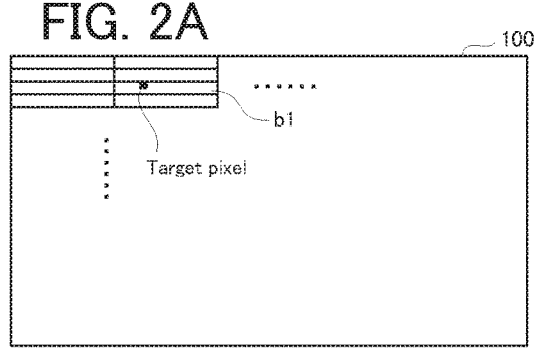
FIG. 2A to FIG. 2D are diagrams illustrating one example of a block shape used for parallax calculation in the parallax calculating apparatus according to the embodiment.
Figure 2B:
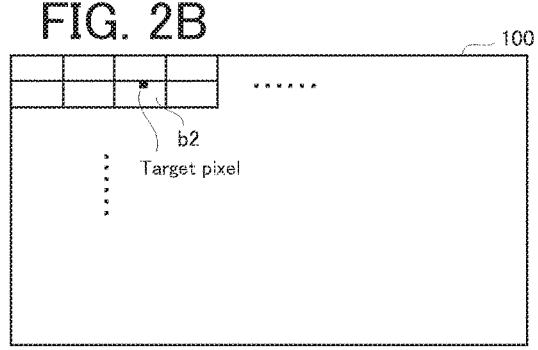
Figure 2C:
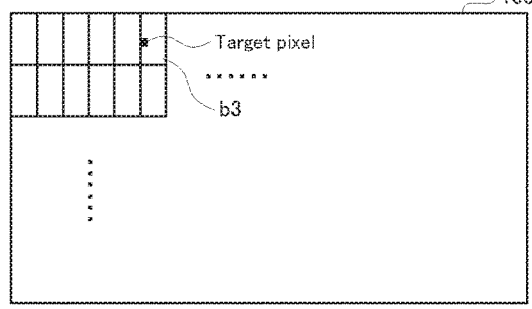
Figure 2D:
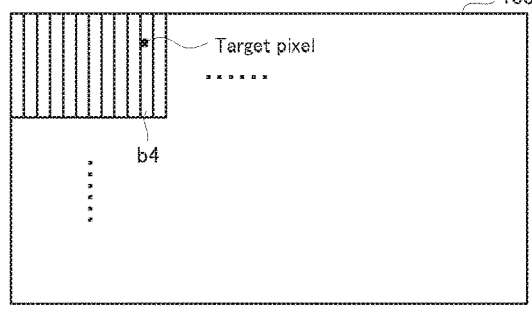

Back in FIG. 1 again, the block size selector 30 is configured to obtain costs of a plurality of blocks, each of which includes a target pixel in which the parallax is to be obtained, from calculation results of the cost calculators $23a$, $23b$, . . . , and $23N$. Specifically, for example, if a pixel illustrated by a black dot in FIG. 2A to FIG. 2D is the target pixel, the block size selector 30 may obtain costs of a block b1 (FIG. 2A), a block b2 (FIG. 2B), a block b3 (FIG. 2C), and a block b4 (FIG. 2D).

The block size selector 30 is configured to compare the costs and to select a block (or shape) with a minimum cost. The parallax image generator 40 is configured to set the parallax value of the block selected by the block size selector 30, as the parallax value of the target pixel. The block size selector 30 and the parallax image generator 40 are configured to repeatedly perform the same process on all the pixels that constitute the standard image 100 (refer to FIG. 2A to FIG. 2D), thereby generating the parallax image.

(Technical Effect)

The parallax calculation or similar operation in the processor 20 may be performed in units of blocks (or blockwise calculation). It is thus possible to suppress the calculation cost and the memory consumption in comparison with the calculation of the parallax or the like in units of pixels (or pixelwise calculation). In addition, in the processor 20, the parallax calculation for each block shape or the like is processed in parallel. It is thus possible to reduce a processing time in comparison with the calculation of the parallax or the like in units of pixels (or pixelwise calculation), even though the parallax calculation or the like is performed for each of the plurality of block shapes.

In the parallax calculating apparatus 1, the parallax value is obtained for each pixel, as described above. It is thus possible to improve the parallax accuracy and to obtain a relatively high density parallax image. Particularly in the parallax calculating apparatus 1, when the parallax value of the target pixel is obtained, the block with the minimum cost is selected (i.e. the block shape with the minimum cost is selected) from the plurality of blocks in different block shapes, each of which includes the target pixel, and the parallax value of the selected block is set as the parallax value of the target pixel. Therefore, it is expected that the parallax value of each pixel is automatically a parallax value calculated by using the block in the block shape that is optimal for each pixel.

The "strain corrector/rectifier 10" and the "processor 20" according to the embodiment are respectively one example of the "acquirer" and the "processor" according to embodiments of the present invention. The "block size selector 30" and the "parallax image generator 40" according to the embodiment are one example of the "selector" according to embodiments of the present invention. C First Modified Example Each of the cost calculators 23a, 23b, . . . , and 23N may calculate a variance value of the parallax in the block group, as the index indicting the uniformity of the parallax associated with the block group, instead of the sum of squares of the parallax difference. In the example illustrated in FIG. 4, the index indicating the uniformity of the parallax may be expressed as $\{(p1-m)^2+(p2-m)^2+(p3-m)^2+(p4-m)^2+(p5-m)^2+(p6-m)^2+(p7-m)^2+(p8-m)^2+(p9-m)^2\}/9$. Here, "m" is a mean value of the parallax in the block group. In the example illustrated in FIG. 4, $m=(p1+p2+p3+p4+p5+p6+p7+p8+p9)/9$.

Second Modified Example

Each of the cost calculators 23a, 23b, . . . , and 23N may calculate a simple sum of absolute values of differences, each of which is a difference between the mean value m of the parallax in the block group and a respective one of parallaxes of a plurality of blocks included in the block group, as the index indicating the uniformity of the parallax, instead of the sum of squares of the parallax difference. In the example illustrated in FIG. 4, the index indicating the uniformity of the parallax may be expressed as $|p1-m|+|p2-m|+|p3-m|+|p4-m|+|p5-m|+|p6-m|+|p7-m|+|p8-m|+|p9-m|$. In the example illustrated in FIG. 4, $m=(p1+p2+p3+p4+p5+p6+p7+p8+p9)/9$.

The invention may be embodied in other specific forms without departing from the spirit or essential characteristics thereof. The present embodiments and examples are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A parallax calculating apparatus comprising:
   an acquirer configured to obtain a pair of images photographed by a stereo camera;
   a processor configured to perform, on each of a plurality of types of block shapes that are different from each other, (i) a parallax calculation process of dividing a standard image, which is one of the pair of images, into a plurality of blocks and of searching for a corresponding point included in a reference image, which is the other image of the pair of images, for each of the plurality of blocks, thereby calculating a parallax, (ii) a block group setting process of setting a block group, which includes a target block out of the plurality of blocks and a plurality of surrounding blocks surrounding the target block out of the plurality of blocks, and (iii) a cost calculation process of calculating an index indicating uniformity of the parallax associated with the set block group on the basis of a result of the parallax calculation process and of associating the calculated index with the target block as a cost indicating an evaluation associated with the target block; and
   a selector configured to perform, on each of a plurality of pixels that constitute the standard image, a parallax selection process of setting a parallax, which is calculated by the parallax calculation process, of a block in which the cost associated by the cost calculation process is minimum, as a parallax of a target pixel, from among a plurality of blocks, each of which includes the target pixel out of the plurality of pixels and which respectively correspond to the plurality of types of block shapes.

2. The parallax calculating apparatus according to claim 1, wherein said processor is configured to perform, in parallel, the parallax calculation process, the block group setting process, and the cost calculation process for each of the plurality of types of block shapes.

3. The parallax calculating apparatus according to claim 1, wherein the cost calculation process includes (i) calculating a parallax difference between adjacent block in the set block group on the basis of the result of the parallax calculation process, and (ii) calculating the index on the basis of the calculated parallax difference.

4. The parallax calculating apparatus according to claim 3, wherein said processor is configured to perform, in parallel, the parallax calculation process, the block group setting process, and the cost calculation process for each of the plurality of types of block shapes.

* * * * *